United States Patent [19]

Boetje et al.

[11] Patent Number: 6,038,368
[45] Date of Patent: *Mar. 14, 2000

[54] SYSTEM FOR ACQUIRING, REVIEWING, AND EDITING SPORTS VIDEO SEGMENTS

[75] Inventors: Gerard J. Boetje, San Ramon; Peter A. Dare, San Jose; Scott Smyers, Los Gatos, all of Calif.

[73] Assignees: Sony Corporation, Tokyo, Japan; Sony Electronics, Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/596,677

[22] Filed: Feb. 5, 1996

[51] Int. Cl.⁷ .................................................. H04N 5/76
[52] U.S. Cl. ................... 386/52; 388/65; 388/95
[58] Field of Search .................. 386/52, 55, 54, 386/95, 46, 121, 91, 57, 64, 65; 348/7, 906, 13, 157; 360/132, 13; 345/328; H04N 5/76

[56] References Cited

U.S. PATENT DOCUMENTS

| | | | |
|---|---|---|---|
| 4,977,503 | 12/1990 | Rudnick et al. | 364/410 |
| 5,125,592 | 6/1992 | Sato | 242/189 |
| 5,136,448 | 8/1992 | Kiriyama et al. | 360/128 |
| 5,216,565 | 6/1993 | Yamaguchi | 360/132 |
| 5,231,512 | 7/1993 | Ebihara et al. | 358/335 |
| 5,249,056 | 9/1993 | Foung et al. | 358/214 |
| 5,297,753 | 3/1994 | Abe | 242/198 |
| 5,305,438 | 4/1994 | MacKay et al. | 395/164 |
| 5,363,297 | 11/1994 | Larson et al. | 364/410 |
| 5,367,341 | 11/1994 | Schnorf | 348/616 |
| 5,390,870 | 2/1995 | Sawada et al. | 242/344 |
| 5,432,668 | 7/1995 | Tanaka | 360/132 |
| 5,455,722 | 10/1995 | Fujii et al. | 360/60 |
| 5,462,275 | 10/1995 | Lowe et al. | 273/94 |
| 5,469,209 | 11/1995 | Gunday et al. | 348/96 |
| 5,729,471 | 3/1998 | Jain et al. | 348/13 |
| 5,786,955 | 7/1998 | Kori et al. | 386/121 |

*Primary Examiner*—Huy Nguyen
*Attorney, Agent, or Firm*—Blakely, Sokoloff, Taylor & Zafman LLP

[57] ABSTRACT

A computer system is provided for recording, processing, and distributing video information. The computer system includes a bus for driving compressed digital video and audio information and compressed digital information associated therewith. The computer system also includes at least one digital video camcorder, a processor, a memory, and a user interface. The computer system preferably further includes a mass storage device including a database. The database stores video information and digital information associated with the video information. The computer system also includes a deck for recording and playing information received from the DVCR and from the mass storage device.

1 Claim, 6 Drawing Sheets

SYSTEM FOR ACQUIRING, REVIEWING, AND EDITING SPORTS VIDEO SEGMENTS

BACKGROUND OF THE INVENTION

(1) Field of the Invention

The present invention relates to the field of video acquisition, processing, and distribution. In particular, the present invention relates to an apparatus, a computer system, and a method for recording, editing, reviewing, and distributing video segments.

(2) Description of Related Art

For many years, it has been the practice, in professional sports, such as football, basketball, and soccer, to manually accumulate statistical data on the game and on the performance of the players and of the teams. In football, for example, much of this data relates to line-ups, individual statistics, team statistics, defensive statistics, ball possession, etc. Such data is typically accumulated during a game by a human and then, after the game is over, entered into a computer database.

Historical and statistical data relating to major league games and the performance of the players involved therein represents an important tool for coaches or other sports experts to prepare strategies for future sports confrontations. Typically, the statistical data is manually recorded during a game while the game is recorded on a videotape concomitantly. For football, by way of non-limiting example, two to three camcorders record each play of the game. Camcorders are positioned above one end zone, midfield and optionally at the line of scrimmage. Each camera records for a few seconds the scoreboard prior to the play. An assigned person fills out statistical data for each play on paper.

At the end of the game, the tapes are immediately consolidated into a set of three tapes: offensive, defense, and special plays. These tapes are dubbed and a copy given to the visiting team, along with a copy of the play information sheets. In this way the video information and the accompanying statistical data associated therewith are stored onto two different media: the videotape and the paper.

When review is desired, coaches typically ask a human editor to create a tape showing specific plays, the request being specific to the types of plays the coach is interested in. For example, a coach might ask for all offensive fourth down and long yardage plays performed during the last three months by their next opponent. The editor manually reviews the play sheets, retrieves the appropriate tapes based on those offensive fourth down and long yardage plays the editor finds in the play sheets, and assembles a new tape based on the coach's specification. Some teams manually enter the play information sheets into a computer database. However, the editor still needs to pull the proper tapes, identify the plays responsive to the request and find the correct plays on a tape manually, e.g., by fast forwarding until the play is found.

The current system for recording and processing sports events is, however, burdensome. For example, during recording of a game the camera operator is required to focus on the scoreboard, film it, and then re-focus on the play—all in a span of a few seconds. This procedure is tedious and subject to errors. Moreover, the editing step, in current systems, involves a human operator both for the assembly of a tape containing a certain game and the assembly of a tape containing specific clips from different games. Furthermore, the current systems and methods utilize both a videotape with a game recorded thereon and statistical sheets with statistical data recorded thereon. The handling of information on two separate storage media is not desirable and can be inconsistent.

It is desirable to provide an apparatus and method for reviewing and editing and distributing video segments where the involvement of human operators is substantially reduced or eliminated. It is also desirable to provide an apparatus and method for obtaining reviewable searchable statistical information and video information stored on a single removable storage medium such as a videotape. It is also desirable to provide for an apparatus and method for annotating a video segment of information, representing a play, with a scoreboard generated, by a computer, from statistical information corresponding to the respective segment.

BRIEF SUMMARY OF THE INVENTION

A removable video storage device according to the present invention typically includes a storage medium having a first region for storing at least one segment of video information and a second region storing machine-readable information associated with the at least one segment. The removable video storage device according to the present invention further includes a memory device, coupled to the storage medium, for storing at least one index identifying a location, within the first region, at which the at least one segment of video information is stored. The machine-readable information, representing text associated with at least one segment, includes at least one index.

The present invention also provides for a computer system including: a bus for driving compressed digital video and audio information and digital information associated with the video and audio information; at least one compressed format digital video camcorder (DVCR) coupled to the bus, for recording and playing the compressed video and audio information and the digital information; a processor coupled to the bus; a memory coupled to the bus; a user interface, coupled to the bus, for controlling the digital information associated with the video information; a mass storage device including a database, the database storing video information annotated with the digital information associated therewith; and a DVCR for recording and playing information received from the at least one DVCR and from the mass storage device.

The present invention also includes a method for recording and processing video information in a video image storage, processing, and distribution system. The method includes the following steps: (a) recording video information onto at least one segment of a first video storage medium in a compressed digital video format, the video storage medium being disposed in a first removal video storage device; associating and storing, in a first memory, a first index for each recorded segment, the first memory being disposed within the first removable video storage device; retrieving selectively the at least one segment from the first removable video storage device; recording the retrieved segment, at the first predetermined location, onto a video storage medium of a secondary removable video storage device; associating and storing in a second memory a second index for the segment recorded onto the video storage medium of the second removable video storage device, the second memory being disposed within the second removable video storage device; inputting statistical data, corresponding to the segment recorded onto the video storage medium of the second removable video storage device, onto a database; and recording the database, at the second predetermined location, onto the video storage medium of the second removable video storage device.

BRIEF DESCRIPTION OF THE DRAWINGS

The features, aspects, and advantages of the present invention will become more fully apparent from the following detailed description, appended claims, and accompanying drawings in which:

DETAILED DESCRIPTION OF THE INVENTION

In the following description, numerous specific details are set forth to provide a thorough understanding of the present invention. However, one having an ordinary skill in the art may be able to practice the invention without these specific details. In some instances, well-known circuits, structures, and techniques have not been shown in detail to not unnecessarily obscure the present invention.

Figure 1:
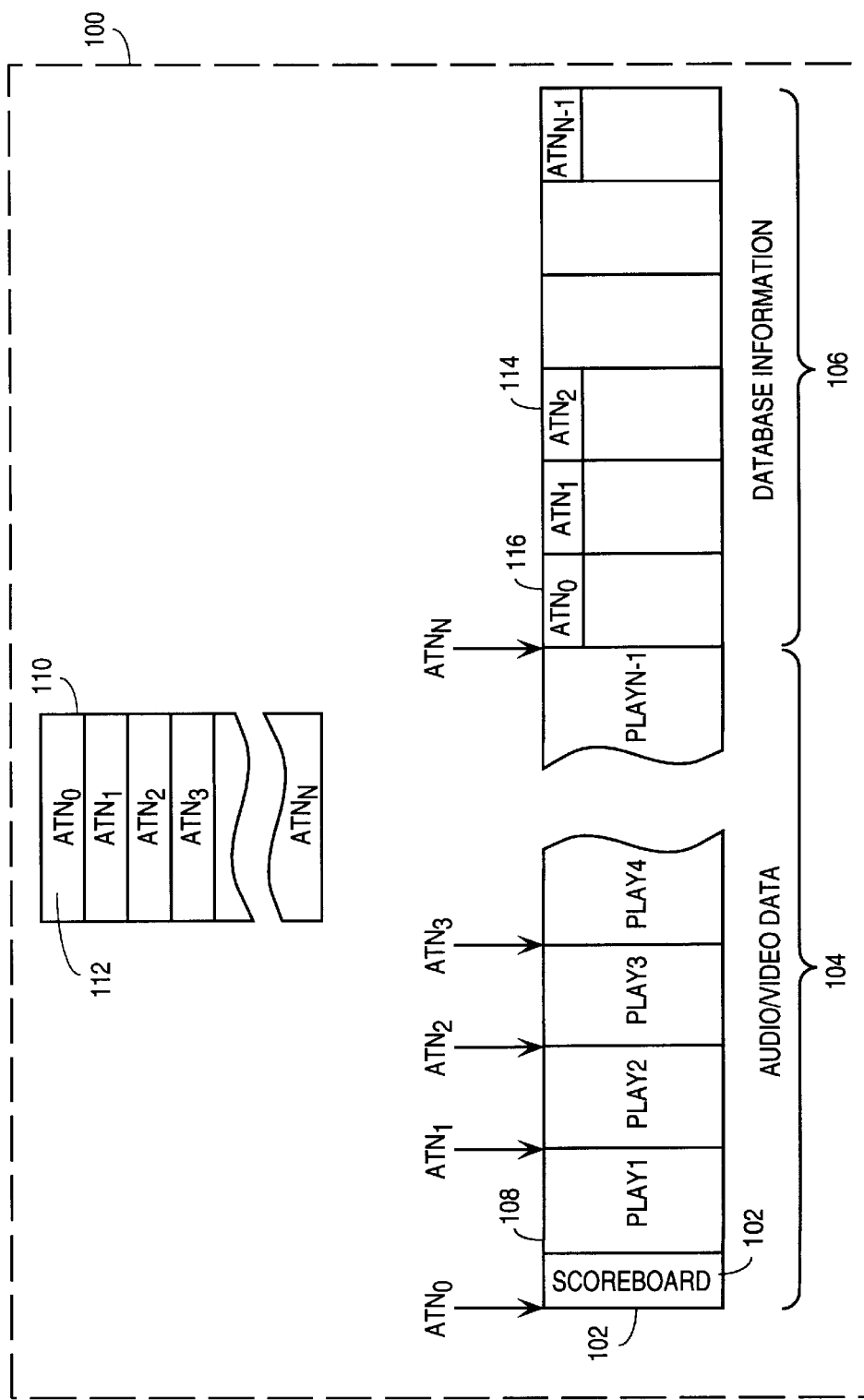
FIG. 1 is a block diagram of a removable video storage device according to the present invention.

FIG. 1 is a simplified illustration of a removable video storage device 100 including a storage medium 102 having data stored thereon organized according to the present invention. The removable video storage device 100 can be by way of non-limiting example a digital videocassette which can be used in conjunction with a digital camcorder. Hereinafter, the videocassette shown in FIG. 1 will be referred to as Memory In Cassette (MIC) tape. The camcorder can record onto the cassette video information which can be later played by the camcorder or by a deck videotape recorder (VTR) (not shown). The removable video storage device 100 can be used, for example, in conjunction with a compressed format (DV) digital camcorder such as VX-1000 marketed by Sony Electronics, Incorporated.

Storage medium 102 can be any medium capable of storing digital information in a digital video data format, such as a digital tape. Storage medium 102 will be hereinafter denominated as "tape." The tape 102 has a first region 104 for storing at least one segment of video information. In the preferred embodiment illustrated in FIG. 1, the first region 104 includes N-1 segments of video information stored on tape 102 in a compressed digital video data format. Typically, each segment 108 includes a plurality of video frames (not shown) stored in a continuous sequence. The video frames are recorded on the tape 102 from a first predetermined time, which marks the beginning of a video shot, to a second predetermined time which represents the end of that video shot. In the preferred embodiment illustrated in FIG. 1, segments 108 contain sequential video frames shot during a football play. A play is defined as a sequence of events that takes place between a change in the score in connection with a sports event. The segments 108 can also include a portion 120 which stores a graphic representation, such as a scoreboard, corresponding to the respective segment. Such scoreboard can be generated in graphical form by a computer, during an editing process which will be explained later in this section, by using statistical information related to the respective segment.

Tape 102 further includes a second region 106. Region 106 stores computer-readable information associated with segments 108. This computer-readable information stored is typically textual information, in digital format, organized and stored in a database. In the present embodiment, the textual information includes statistical data associated with the video segments 108. By way of non-limiting example, the statistical data included in the region 106 includes information accumulated during a sports event such as a football game. Such information can relate to incidence of fouls, field goals, passes received, passes intercepted, kick-off returns, yardage, touch-downs, etc.

The statistical data contained in the database information region 106 is associated or linked to the segments 108 by means of automatic track numbers (ATN) indices 112. An ATN index marks the location on the tape 102 where a segment or play 108 is stored. The ATN indices are preferably automatically stored in a memory device 110 which is disposed within the cassette 100 when recording of each play or segment is initiated. Memory device 110, which can be by way of nonlimiting example an erasable programmable read-only memory (EPROM), is coupled to the tape 102. A separate device located in the camcorder and located in the playback hardware accesses the EPROM, enabling the camcorder or playback hardware to forward directly to the play or segment of interest. As one can see from FIG. 1, memory 110 includes a collection of fields 112 storing the indices $ATN_i$, for i=0–n, where $ATN_i$ point to the beginning of each segment; 108 of the tape 102. In the present embodiment, the last ATN, ATNn points to the second region 106, at the end of the tape, where database information is stored.

The ATNs are created at the time the segments of video information are recorded onto the tape 102. Upon initiation of recording of a certain segment onto tape 102, the camcorder utilizing videocassette 100 notes the location on tape 102 where the segment starts and records a corresponding "address," or track number, i.e., ATN, of that location into the memory 110. For example, the camera operator presses a predetermined button on the camera at the beginning of a play to "mark" the beginning of the "take".

It is contemplated that the memory 110 can store other information. For example, it is preferred that the memory stores the data the video is created and a tape identification (ID) which may be entered by the operator or programmed.

The second region 106 of the tape 102 stores, for each video segment 108, a database portion 114 representing textual information associated with the video segments 108. Each database portion 114 includes a field 116 storing the respective ATN index, or an offset thereof, identifying the segment of video information with which the database portion 114 is associated. In such way, access can be provided to a selected segment of video information stored on the first region 104 of the tape 102 by simply searching the database portion 114 on the computer by means of a user interface such as a keyboard and a video monitor, mouse, voice-recognition device etc., as shown in FIG. 2.

Figure 2:
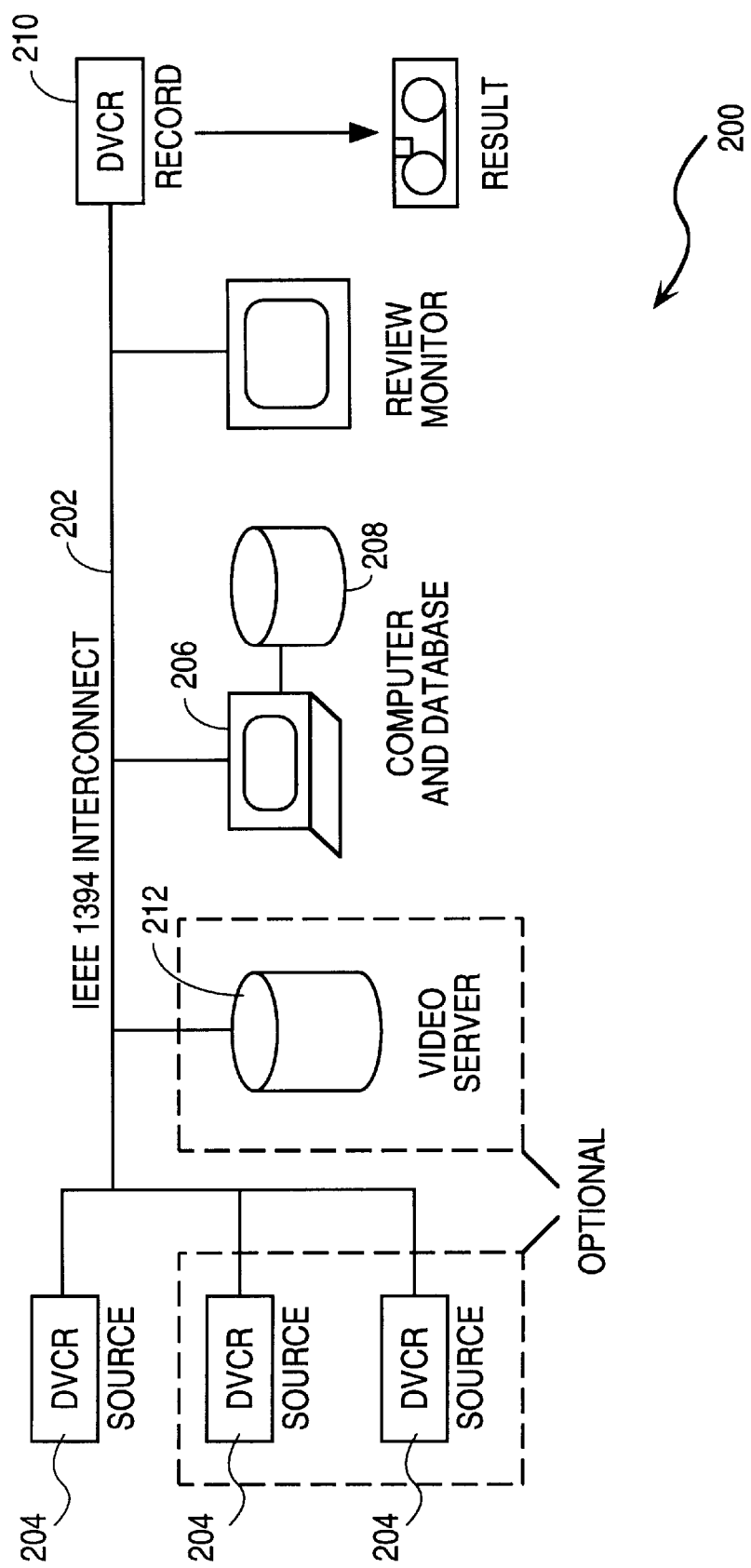
FIG. 2 illustrates a block diagram of a computer system according to the present invention in an editing configuration.

FIG. 2 illustrates a diagrammatic representation of an illustrative computer system 200, according to the present invention, for acquiring, editing, reviewing and distributing video information. The computer system 200 includes a bus 202 for driving compressed video and audio information, including compressed audio and video information, and other digital information associated with the video and audio information. Bus 202 can be by way of non-limiting example a device interconnection bus configured in accordance with the Institute of Electrical and Electronic Engineers (IEEE) 1394 standards. The bus 102 and the devices coupled thereto form an IEEE 1394 local area network (LAN) which offers high bandwidth mixed isochronous and asynchronous transfer. The IEEE 1394 is a standard which was jointly developed by Sony Electronics, Inc. and by Apple Computer, Inc. for usage in high performance multimedia networks. For a more detailed description of the IEEE standard 1394, see IEEE std 1394: 1995, Standard for a High Performance Serial Bus. The bus 202, thus, provides a means for transferring both compressed video/audio information and digital information among the various devices coupled to this bus.

The computer system 200 further includes one or more digital video camcorders (DVCR) 204 which are coupled to the bus 202. The DVCRs 204, also called "intelligent camcorders", utilize MIC cassettes which can store digital video and audio data. A standard feature of the DVCR is the capability to generate index marks such as the ATNs explained in conjunction with FIG. 1, each time a camera operator marks a "take" during a recording. The DVCR 204 can be controlled by a computer 206 to access specific segments based on the ATN indices stored in the MICs or in any other intelligent removable video storage devices which have features similar to the device described in conjunction with FIG. 1. Computer 206 can be a conventional digital computer having a processor, a memory, and a user interface, all coupled to the bus 202. This computer 206, by execution of appropriate software stored in the memory, can issue control signals to the DVCR 204 to perform certain functions such as playback and recording of segments of video. Preferably the control information follows the protocol described in "Specifications of AV/C Command and Transaction Set for Digital Interfaces", HD Digital VCR, December 1995.

One important characteristic of the device interconnection bus 202 is the capability of transferring both isochronous signals and asynchronous signals therethrough. Video data, which is isochronous, has to obey to video timing requirements which guarantee a certain time of arrival of the video signal once this data is transferred. On the other hand, computer 206 controls the operation of the DVCR 204, when the DVCR 204 is connected to the network, by means of control signals which are asynchronous.

In addition to recording images on a digital tape such as the one explained in conjunction with FIG. 1, DVCR 204 can also be used to transfer video data and computer data over the network to other digital camcorders coupled to the network or to the computer 206. Furthermore, digital data residing in the memory of a MIC tape can be read and written to by means of the DVCR.

The computer system shown in FIG. 2 additionally includes a mass storage device 208 coupled to a processor (not shown) of the computer 206. The mass storage device 208 includes a database used for storing digital computer information associated with the video information recorded by DVCR 204. The information stored in the database can include, by way of non-limiting example, statistical information related to a football game. As it will be explained later in this section, the database information can be entered in the database by a human operator after the conclusion of a football game. Such information can then be subsequently downloaded and recorded onto the MIC videocassette containing the corresponding video in the format explained in conjunction with FIG. 1. Thus, the videotape contains both video and statistical information, the statistical information being directly linked to the corresponding video information. Thus, the video tape distributed to other teams is self contained and auto correlated. Therefore, using a playback system such as the system described herein, computer queries can be made by an editor or a coach to the database stored on the tape requesting video playback of only those plays which fit certain criteria determined by the database. As noted herein, it is preferred that the database is initially downloaded to a hard drive or other random access storage device of the computer system for a rapid and direct access of the data needed to execute the query. The result of the query to the database, for example, can be a listing of tapes and tape indices related to the relevant plays or the automatic generation of a tape containing the relevant plays.

As noted above, the computer 206 can be a computer that supports the IEEE 1394 protocol. Such computer could have built-in scripting capability for generating most of the control functions to the DVCRs. The scripting system is network transparent, allowing distribution of some application functions over the network. The computer 206 can also have built-in voice recognition to allow for input of queries into the database.

In one embodiment, an on-line video server 212 is coupled to the bus 202 for providing enhanced operation of the system. Preferably, the video server 212 stores copies of the contents of numerous MIC videotapes. It is contemplated that the video and database information located on a tape is downloaded from the tape to the video server 212 when the tape is loaded into a DVCR coupled to the network. The download from the tape to the video server can be automated such that when a tape is first queued up in a DVCR coupled to the network, the video and database information is downloaded to the video server. As is apparent from the discussion herein, when loaded in the video server, the video server maintains the correspondence between plays and corresponding statistical information. For example, this may be achieved by use of the correlation of the ATN number and tape identification (ID) (which may also be stored in the memory of the tape) and the corresponding statistic information on the server. Obviously other indices to maintain the link between the video and statistical data can be used. The video server 212 can be a hard disk drive with a 1394 interface replacing the standard SCSI interface. A drive with a 1394 interface can directly access the video information on the network giving the appearance to the network that it is a video source or destination.

Once the contents of the tapes are downloaded to the video server 212, the video server 212 can provide the capability of editing several video tapes without the intervention of a human operator. For example, a query can be initiated at the computer 206 for information that, in the absence of the video server, would otherwise be stored on several tapes. The video server 212, provides real time access to video information stored thereon such that when a query is initiated at a station remote from the video server, a resulting list of tapes and the relevant indices, pointing to locations on these tapes where pertinent information is stored, is generated. Computer 206 coupled to the video server 212 can then direct to video server to execute a non-linear play out of the relevant video clips and transmit these clips via the bus 202 to the recording deck 210, thereby generating a tape containing the plays and, alternatively, the statistical information associated with the plays.

Such a computer system as described with reference to FIG. 2 can be configured to provide real time play back of queried plays and corresponding statistical information. For example, a single actual display configuration can be provided to the user. Based upon a query entered, the video clips responsive to the query can be sequentially played back under the control of the user via a computer input device such as a keyboard, mouse or the like. Similarly, a portion of the screen (in a single configuration), or a second screen (in a multiple display configuration) can be used to display corresponding statistical information. In addition, it is contemplated that a portion of one display or a separate display provides a graphical user interface to simplify selection of the options and features described herein.

Figure 3:
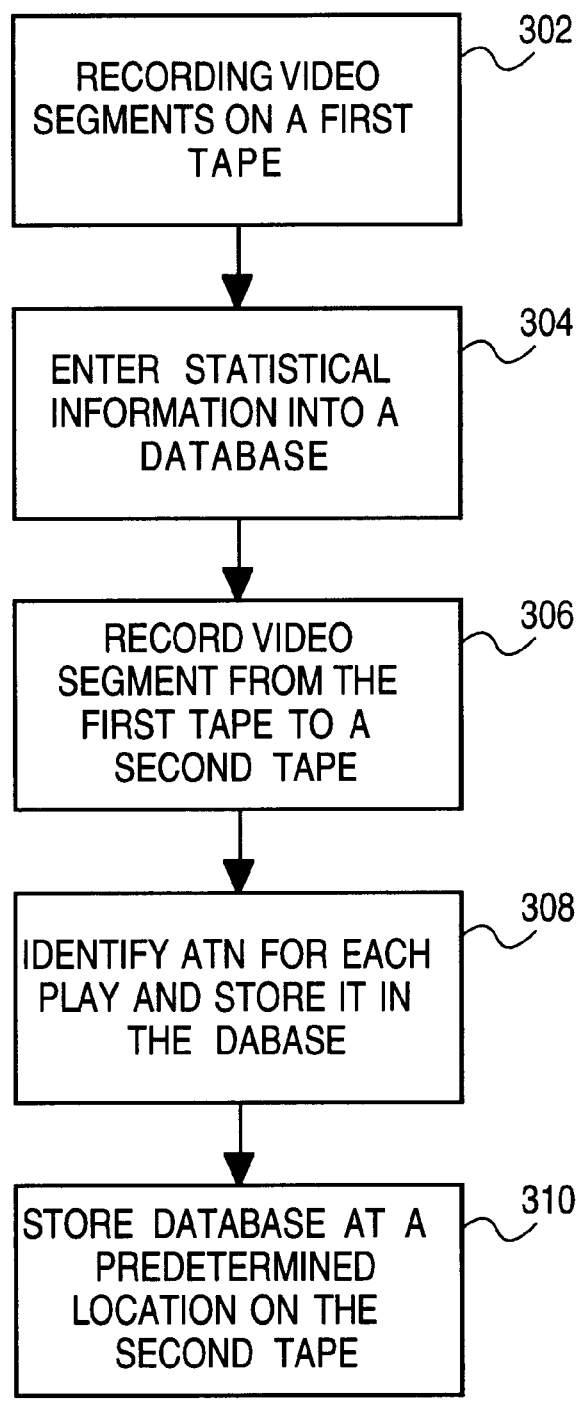
FIG. 3 illustrates a flowchart diagram recording process according to the present invention.

The system illustrated in FIG. 2 can, thus, be used for both recording and processing video information. The process of recording, editing, or reviewing and distribution of video information in conjunction with the system illustrated in FIG. 2 will now be explained. FIG. 3 illustrates a flow chart diagram 300, according to the present invention, for the process of recording information from a first tape video tape to a second video tape. At block 302, video information is recorded on a MIC videocassette, such as the one explained in conjunction with FIG. 1, via the DVCR (source) 204 shown in FIG. 7. The video information is, thus, recorded onto at least one segment of video storage medium such as a digital videotape in a compressed digital video format. The DVCR 204 of FIG. 2 associates and stores in a memory of the MIC videocassette a first ATN index for each recorded segment of video information. The ATN index stored in the memory of the MIC cassette will later allow a computer, during the editing, review, and distribution process, to directly access selected tape segments of the MIC videocassette and process them in a desired form. Once the video information has been recorded onto the MIC videocassette, recording and editing, to another tape, is performed by using the computer system illustrated in FIG. 2. An operator loads the MIC tapes into the DVCR camcorder source/sources 204, if review of more than one tape at the same time is desired. The operator can, using a computer input device, such as a keyboard, mouse, graphical user interface or the like "remotely" play the tapes in the DVCR 204 by sending control signals via the bus 202 to each DVCR 204 indicating what portions to be played. At block 304, for each segment of data recorded onto the videotape, an operator enters the statistical play data information into a database. Preferably, this data had been previously entered and is ready for download to the tape. At block 306 all or selected segments (plays) of the first tape are recorded onto the second tape. At block 308, the computer identifies, by control of operation of the coupled DVCR, for each segment recorded onto the second tape, the ATN corresponding to the position of the recorded segment onto the second tape. Preferably, this occurs automatically when the recording of a segment is initialized. The ATN is stored in the memory of the second tape which stores the ATNs. The computer then associates the new ATNs (of the second tape) with the portion of database corresponding to the respective segments recorded onto the second tape. This is typically done by storing the ATN index, or offset thereof, in a specified field in the database corresponding to the play recorded on the tape. This process of transferring segments and recording ATNs is repeated for each segment. Once the recording of the selected video segments is completed, the system stores, at block 310, or updates the last portion of the second tape with the corresponding database information.

More particularly, the process illustrated in FIG. 3 can be used in conjunction with the computer system illustrated in FIG. 2 for generating a master tape for The National Football League (NFL) by automatically intercutting video clips from several tapes. Intercutting is defined as the process of editing and recording video clips from more than one tape. Automatic intercutting allows intercutting without human intervention other than for loading the tapes in camcorders. Initially, the football game is filmed by using three camcorders, one located in one end zone, midfield and one shooting at the line of scrimmage. Three tapes are thus generated by the end of a football game. The computer system illustrated in FIG. 2 is then used to assemble the information from the three tapes thereby generating one single tape which includes both video and statistical information from all three tapes (intercutting).

Therefore, in an automated intercutting system, the computer controls via the network the four VTRs used to playback and record the video. The computer or some coupled memory device also stores the associated statistical information in the database. This statistical information may include team-specific data and/or league-wide supplied data, referred to as "Superstat". The computer then automatically stores on the master tape created, each clip from each tape (originating from the two or three cameras) in sequence so that the three views of a play are recorded on the master tape in sequence. As discussed earlier, the computer knows, from the memory the tape ID and from referencing the ATN information stored on the tape, the locations of the beginning of each play on each tape. The corresponding ATN number is updated in the memory on the master tape to reflect the location of the beginning of the video for the play recorded on the master tape. The database controlled by the computer also is updated to identify the ATN number and tape ID for the play. Once all the plays are recorded on the master tape, the database information for those plays is written to the tape at an unused portion of the tape, and the next unused, or last ATN number, is updated in the memory of the tape to identify the beginning of the database information. The nature of the data transferred from the computer to the video recorder for recording on the tape is transparent to the recorder. Depending upon the network connection and recording equipment used, the computer may encapsulate the database information in a format or packet compatible with the recording equipment so that transparency of the data is maintained.

Figure 4:
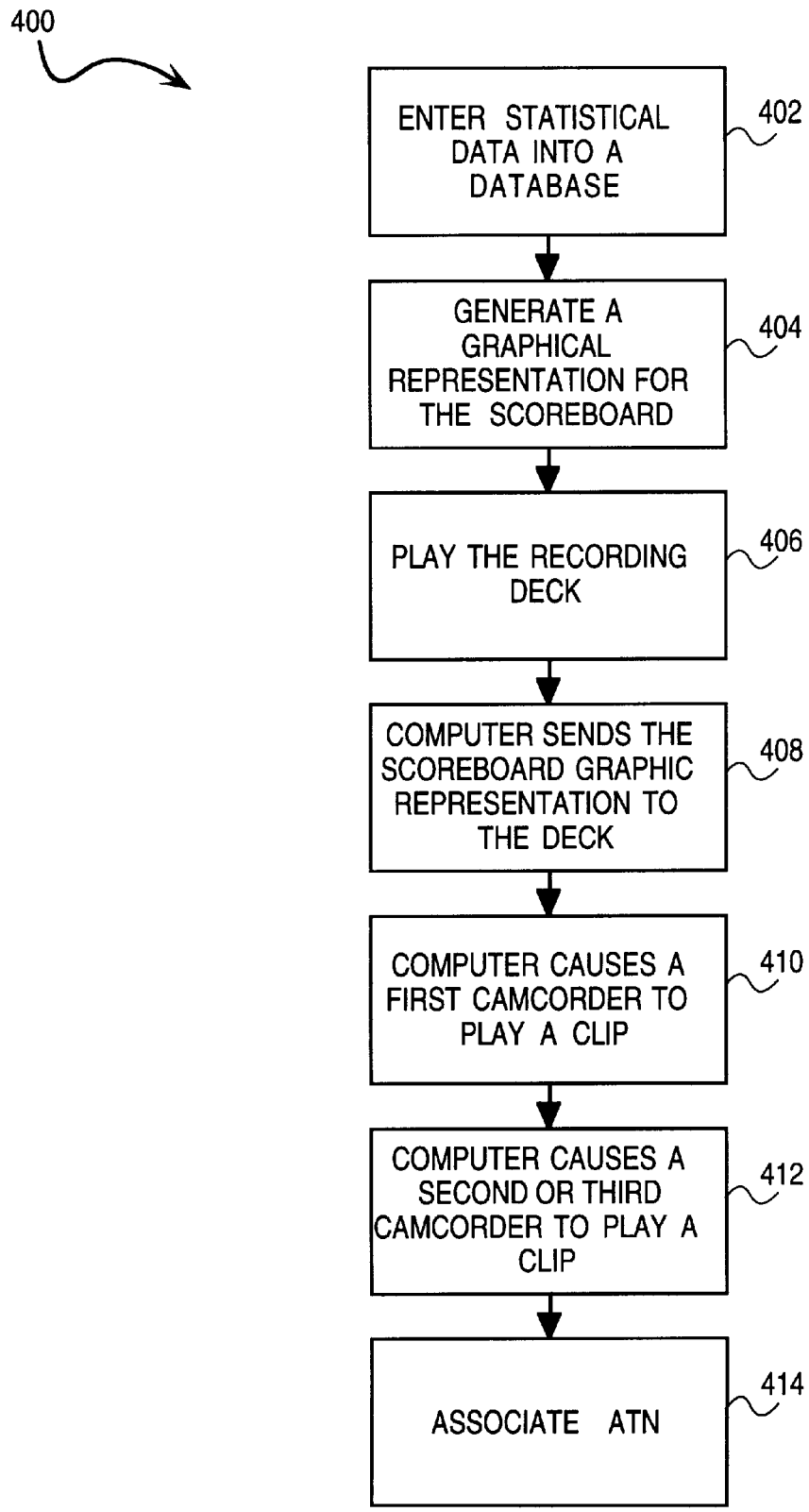
FIG. 4 illustrates a flowchart diagram for the digital recording of a scoreboard.

The setup of the computer system according to the present invention, having two or three DVCR sources 204 and one DVCR record device 210 coupled to the bus 202 and to the computer 206, allows for an operator to review the three tapes at the same time and manually edit the video prior to recording on the master tape. If all three tapes are used for assembling the master tape at the same time, then the operator reviews plays on each of these three tapes and decides, for each play, what information to edit from all the three tapes and record it in one segment which will be recorded onto the master tape. Additionally, the process according to the present invention provides for generating an artificial scoreboard for the play based on the statistical information collected and compiled during the football game. The generation of the artificial scoreboard provides a graphical representation of the scoreboard which is stored as video as part of the video segment on the tape or in the database as graphical information. Alternately, it is contemplated that the scoreboard is generated from the database information each time the corresponding video is accessed for playback, and displayed with the corresponding video. Preferably, the scoreboard is recorded as video onto the tape. This process is diagrammatically illustrated in FIG. 4. At block 402, of FIG. 4, data from the play sheets related to the game is entered into the database. At block 404 the computer generates a graphic representation of the scoreboard in the database corresponding to a selected play. At block 406 the computer plays the deck, DVCR 210 in FIG. 2, which contains the master tape onto which the video clips corresponding to the play are assembled. At block 408 the computer outputs the graphical representation of the scoreboard such that it appears if a video of the scoreboard is being played by a camcorder or other playback device. The "video" consisting of the digital scoreboard image is transmitted to the deck DVCR 210 via the bus 202. Consequently, the deck DVCR will record the scoreboard image digitally onto the tape. At block 410, the computer causes one of the camcorders to play a selected play of the game. This is accomplished by retrieving the ATN corresponding to the respective play and sending control signals via the bus to the camcorder which will then start playing the respective segment of the tape including the selected play. At step 412 the computer causes a second camcorder to play a selected segment in a similar way as explained in conjunction with block 410. The computer system and process can additionally cause a third camcorder to play its clip in the same manner as explained in conjunction with blocks 410 and 412. Typically the first camcorder will play the image of an end zone while the second camcorder will play the image viewed from the sideline.

The scoreboard generated by the computer from the statistical information related to each play can be stored solely in the database while the video image is stored on the videotapes. The scoreboard can be "linked" with the relevant video information of a play stored on the videotape by associating the ATN index corresponding to the location where the play would be stored on the master tape with the corresponding scoreboard stored in the database. Each master tape generated during the assembly process can be catalogued in the database and assigned a certain identifier. The database can then recognize a tape played in a system, and retrieve relevant portions of the database including the scoreboard corresponding to a particular play of the particular tape by using the ATN index corresponding to the particular play. This method however requires that each end user has access to the respective portion on the database storing the scoreboard.

To improve the efficiency of the assembly/edit process, users can add an optional edit review video server to the review station. This video server is different from a full size on-line distribution server merely serving as a local cache for video data. With this option, the operator copies all three tapes into the server and reviews the plays from the server. The operation can then perform the edits and intercutting desired to place into proper form for the master tape. If desired, the graphically generated scoreboard can also be generated and concatenated to the video clips of the play. The video scoreboard and database information can then be downloaded to the master tape recording on the memory of the master tape the track locations for each ATN indicating the location of the video of each play. Alternately, the operator can review the video and playdata and record the play data onto a master tape in the same way as explained above. After the recording of the video information is performed, the computer directs copying of the video server statistical data onto the deck DVCR.

Once a master tape is assembled, the tape is dubbed for distribution. As the 1394 network can direct data to multiple specific end nodes, i.e., DVCR camcorders, simultaneously (multicasting), several dubs can be made in parallel to the DVCRs coupled to the network. The dubbing can be performed either from a DVCR deck or from a video server if this option is provided to the network. During the dubbing process the computer system will copy the entire tape, including the video and database portions. It is quite likely that a track misalignment occurs during dubbing. This is caused by the initiation of the recording of video data at different tracks.

To overcome this problem, the computer system queries each recording DVCR as to the track location at which the recording begins. The computer system compares the starting track location on the tape to be recorded to the starting track location on the master tape. The memory in the recording tape is written to by the computer system, with track numbers accurately noting the beginning of each play or segment. For example, if the video of the master tape begins at track 3 and the video of the recorded tape begins at track 7, the track locations stored in the ATN of the master tape are adjusted by the difference, e.g., 4, before writing the track locations for the same ATN entries on the recorded tape. Preferably, the database information refers to the ATN number when referencing the corresponding video. As the ATN number remains the same in each copy and only the corresponding track number changes, the database information remains consistent regardless of the copy of the master tape used. This process, useful when dubbing, is also preferably used when copying only selected segments of a certain tape onto another tape. In this embodiment, the ATN numbers again remain the same and the track numbers are adjusted accordingly. Alternately, the selected video segments can be recorded sequentially, the corresponding ATN numbers are maintained and the corresponding track locations are adjusted to reflect the new position of the video on the recorded tape.

Figure 5:
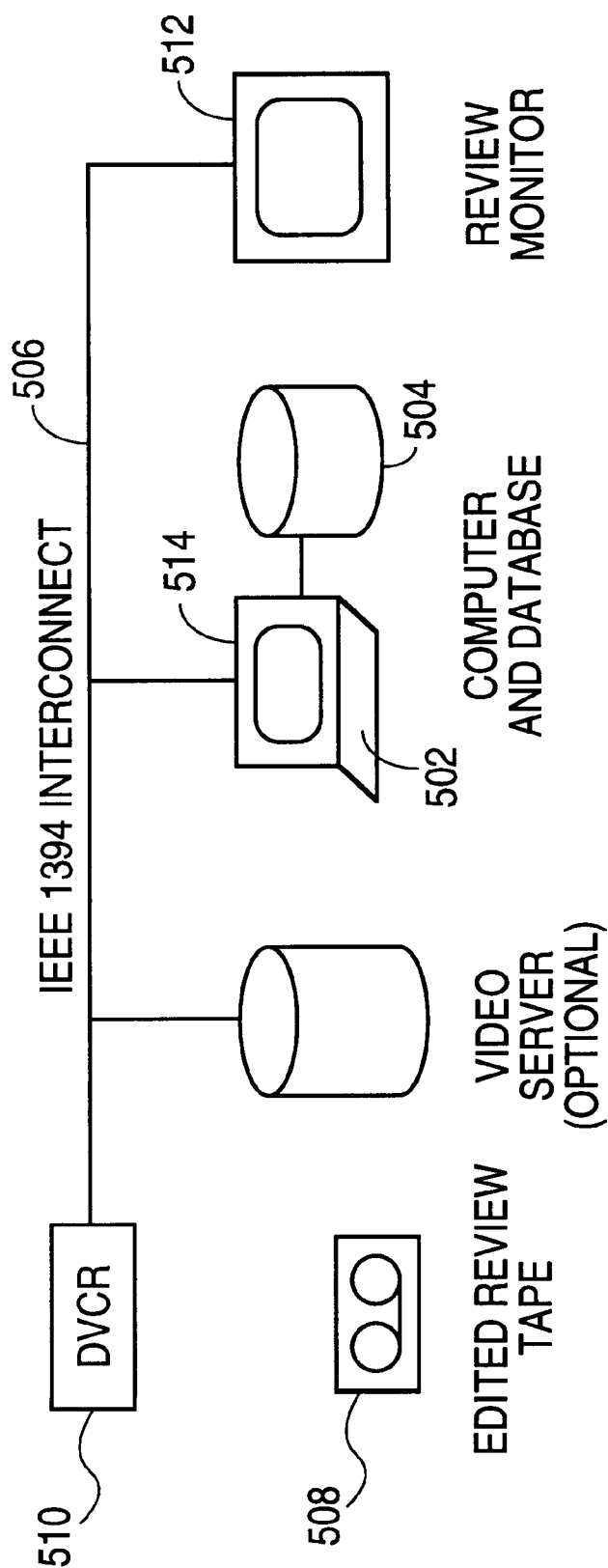
FIG. 5 illustrates a review station according to the present invention.

Once a master tape is created and duplicated, an end user, such as a coach of a football team, can use this tape for edit or review. FIG. 5 shows a diagrammatic representation of a computer station 502 for reviewing and editing tape 508 played in a digital video camcorder DVCR 510 coupled to the computer 502 via a bus 506. Preferably the bus network utilized by a review station complies to the IEEE 1394 protocol which allows the processing of both video and digital information at the same time via the bus 506.

Once the tape 508 is inserted in a DVCR, the computer system automatically or, alternately, an operator selects, via the computer system, a feature which performs a database transfer from the tape to the computer. Thus, the computer accesses the recorded database information at the end of the tape and transfers it to the computer's memory or other storage device. Preferably, a local play database, compresses database information from each tape played on the computer station 502. Thus, manually or automatically, (e.g., via the database information on the tape) the computer then uses that data to update the team's local play database. The tape's identifier (ID) is stored with the database portion originating from the tape. Alternatively, it is contemplated that the storage device storing the local database can store thereon also the video information related to that game together with the statistical information. The local database is therefore updated each time a new tape is received with information related to the games played in a season. In this manner, when a coach is interested in specific information related to a certain team, the coach can assemble one single tape with clips from different tapes storing information related to the team of interest for different games in the season. Preferably, this is achieved by generating a database query which can be entered via a graphic user interface (GUI). Such a GUI can be simple enough to allow the coaches themselves to use the system unaided. A typically query might be something like "fourth down, long yards, Green Bay, last three months". Although generation of GUIs are will known in the art, it is contemplated that the GUI will provide menus or buttons that identify the different database query options available. The operator can then select, using a cursor controlled input device such as a mouse, the desired query options.

Execution of the database query by the computer will produce a list of tapes containing the relevant tape IDs and the ATN indices (numbers) needed to access the relevant plays. The computer can then automatically direct an assemble edit in order to record the desired plays onto a new tape. The editing process for assembling the new tape is similar to the processes described earlier.

Before or after assembling a review tape, the coach can then review the plays and statistical data responsive to the query. For example, the coach can review the assembled tape by accessing different portions of the database of the assembled tape to retrieve plays that are of interest. In the present embodiment, as the coach reviews different plays, the scoreboard and all statistical data related to the play is displayed on the computer monitor shown in FIG. 5. During the review, coaches can add any additional data and comments they want related to the play or set of plays onto the database.

Figure 6:
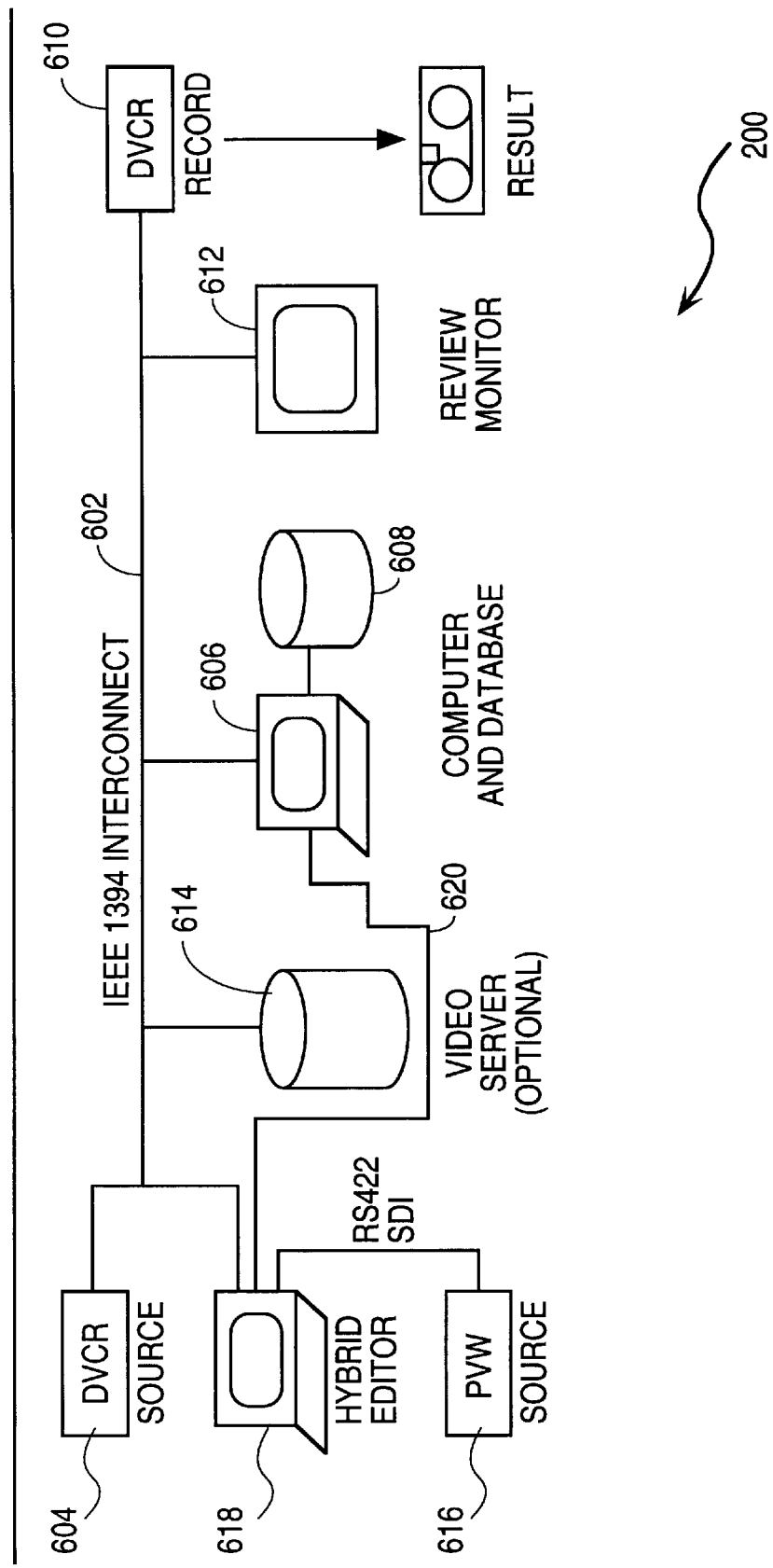
FIG. 6 illustrates a hybrid computer system according to the present invention.

FIG. 6 illustrates a hybrid computer system according to the present invention wherein video information can be played back or recorded either by the DVCR 604 or by a camcorder 616 in an alternate format such as the beta cam format. Alternately, the editor may be a device that solely controls the alternate format device. As many systems in use utilized the betacam format to record, process and distribute video information, the computer system provides backwards compatibility to betacam tapes. Referring back to the embodiment disclosed in FIG. 6, in the case that video images are in DV format 604, the operation of editing, reviewing, and distribution with respect to DVCR, 604 and 610 is preferably identical with the operations explained earlier. However, if the video information is played back using the beta camcorder 616, the system uses the editor 618 to control the camcorder 616 as the editor 618 has the capability to control as linear deck such as camcorder 616. Thus, the added functionality at the computer 606 to control standard linear operations is avoided. The computer 606 simply issues the command to the editor 618 and the editor performs the desired operations. The computer 606 communicates the commands to the editor 618 via the bus 602 or separate serial line connection 620 (for example, in a format compatible with the well known IEEE RS-422 format). Video data played back from the deck 616 is input in the beta format. Thus it is further preferred the editor 618 further translate the video into the DV format prior to transmission on the bus 602.

Similar applications are performed if the master tape generated is recorded by deck 616. In this situation, the database, rather than storing indices of ATNs for each segment recorded, stores the time codes for the different segments.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. In a video image system, a method for recording at least one segment of video information, from a video medium of a source video cassette, onto a video medium of a destination video cassette, said source and destination video cassettes each having a memory including, for each segment, an index identifying a location on the respective medium where said segment is recorded, said method comprising the steps of:

a. retrieving from said source video cassette said at least one segment and a first index corresponding to said at least one segment;

b. identifying, based on said first index, a medium location where the retrieved segment is recorded on the source video cassette;

c. recording said retrieved segment at a first predetermined location of said video medium of said destination video cassette;

d. retrieving from said source video cassette based on a second index, database of non-video data information corresponding to said first index, wherein said video medium of said source video cassette having recorded thereon database of non-video data information corresponding to said at least one segment of video information;

e. identifylng a medium location based on said first index and second index where the database of non-video data information is located;

f. recording said database information at a second predetermined location of said video medium of said destination video cassette; and g. updating said memory of said destination video cassette with said predetermined first and second locations, wherein said step of updating comprises:

determining a first track at which recording was initiated on the source video cassette and a second track at which recording is to be initiated on the destination video cassette;

retrieving the first index and second index from the memory of the source video cassette;

adjusting the medium locations corresponding to the first index and second index by an amount equal to the difference between the first track and second track and storing the first and second indices and corresponding adjusted medium locations in the memory of the destination video cassette.

* * * * *